США009887424B2

United States Patent
Kobayashi et al.

(10) Patent No.: US 9,887,424 B2
(45) Date of Patent: *Feb. 6, 2018

(54) SOLID OXIDE FUEL CELL (71) Applicant: NGK INSULATORS, LTD., Nagoya-shi, Aichi (JP)

(72) Inventors: Ayano Kobayashi, Nagoya (JP); Makoto Ohmori, Nagoya (JP); Mariko Okamoto, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/487,625

(22) Filed: Sep. 16, 2014

(65) Prior Publication Data
US 2015/0004525 A1 Jan. 1, 2015

Related U.S. Application Data (63) Continuation of application No. PCT/JP2014/051820, filed on Jan. 28, 2014.

(30) Foreign Application Priority Data

Mar. 19, 2013 (JP) .................. 2013-056576

(51) Int. Cl.
*H01M 4/90* (2006.01)
*H01M 8/12* (2016.01)
(Continued)

(52) U.S. Cl.
CPC ........... *H01M 4/9033* (2013.01); *C04B 35/01* (2013.01); *C04B 35/4504* (2013.01);
(Continued)

(58) Field of Classification Search
CPC .... H01M 4/90; H01M 4/9025; H01M 4/9033; H01M 4/8828; H01M 8/12;
(Continued)

(56) References Cited

U.S. PATENT DOCUMENTS

2010/0081035 A1 4/2010 Kim et al.
2012/0251917 A1* 10/2012 Son ..................... H01M 8/1213
429/482

(Continued)

FOREIGN PATENT DOCUMENTS

JP 7-220730 A 8/1995
JP 7-254417 A 10/1995
(Continued)

OTHER PUBLICATIONS

The Japanese Office Action and it's translation for the related Japanese patent application No. 2014-504905 dated Apr. 15, 2014.
(Continued)

*Primary Examiner* — Karie Apicella
(74) *Attorney, Agent, or Firm* — Global IP Counselors, LLP (57) ABSTRACT

A solid oxide fuel cell comprises a solid electrolyte layer, a barrier layer, and a cathode. The cathode includes a cathode current collecting layer and a cathode active layer. The cathode active layer includes a plurality of micro-cracks in a surface region within a predetermined distance from the interface between the barrier layer and the cathode active layer.

5 Claims, 4 Drawing Sheets

(51) Int. Cl.
   H01M 8/1213    (2016.01)
   H01M 4/86      (2006.01)
   H01M 8/0236    (2016.01)
   C04B 35/01     (2006.01)
   C04B 35/45     (2006.01)
   H01M 8/124     (2016.01)
   H01M 4/88      (2006.01)
   H01M 8/1253    (2016.01)

(52) U.S. Cl.
   CPC ....... *H01M 4/8621* (2013.01); *H01M 8/0236* (2013.01); *H01M 8/12* (2013.01); *H01M 8/1213* (2013.01); *C04B 2235/3227* (2013.01); *C04B 2235/3272* (2013.01); *C04B 2235/3279* (2013.01); *C04B 2235/3281* (2013.01); *C04B 2235/5436* (2013.01); *C04B 2235/5445* (2013.01); *C04B 2235/5463* (2013.01); *C04B 2235/656* (2013.01); *C04B 2235/6562* (2013.01); *C04B 2235/6565* (2013.01); *C04B 2235/768* (2013.01); *C04B 2235/78* (2013.01); *C04B 2235/85* (2013.01); *C04B 2235/9607* (2013.01); *H01M 4/8828* (2013.01); *H01M 4/8889* (2013.01); *H01M 8/1253* (2013.01); *H01M 2008/1293* (2013.01); *Y02E 60/525* (2013.01); *Y02P 70/56* (2015.11)

(58) Field of Classification Search
   CPC ............. H01M 4/8889; H01M 8/1213; H01M 8/1253; H01M 8/0236
   See application file for complete search history.

(56) References Cited

U.S. PATENT DOCUMENTS

| | | | |
|---|---|---|---|
| 2012/0270139 A1 | 10/2012 | Park et al. | |
| 2013/0295489 A1* | 11/2013 | Kim | H01M 8/0271 429/508 |
| 2014/0127607 A1* | 5/2014 | Kwak | H01M 4/9033 429/482 |

FOREIGN PATENT DOCUMENTS

| | | |
|---|---|---|
| JP | 11-283657 A | 10/1999 |
| JP | 2003-208902 A | 7/2003 |
| JP | 2007-200761 A | 8/2007 |
| JP | 2010-108876 A | 5/2010 |
| JP | 2010-257871 A | 11/2010 |

OTHER PUBLICATIONS

An English Translation of the Written Opinion of the International Search Authority for the corresponding International application No. PCT/JP2014/051820 dated Apr. 15, 2014.

An English translation of International Search Report for the corresponding International application No. PCT/JP2014/051820 dated Apr. 14, 2014.

The Extended European Search Report for the corresponding European application No. 14769044.0 dated Dec. 17, 2015.

Wang et al., "Sulfur Poisoning on La0.6Sr0.4Co0.2Fe0.8O3 Cathode for SOFCs," Journal of Electrochemical Society, Oct. 5, 2011, pp. B1391-B1397, vol. 158 (11), The Electrochemical Society, USA.

* cited by examiner

SOLID OXIDE FUEL CELL

CROSS-REFERENCE TO RELATED APPLICATIONS

This application claims priority under 35 U.S.C. §119 to Japanese Patent Application No. 2013-056576, filed on Mar. 19, 2013. The entire disclosure of Japanese Patent Application No. 2013-056576 is hereby incorporated herein by reference.

BACKGROUND

Technical Field

The present invention relates to a solid oxide fuel cell provided with a cathode.

Background Art

A solid oxide fuel cell generally includes a porous anode, a dense solid electrolyte layer, and a porous cathode (reference is made to Japanese Patent Application Laid-Open No. 2007-200761).

The cathode is formed by separately firing a green body disposed on the solid electrolyte layer that has been fired.

SUMMARY

However, when forming the cathode by firing, there is the problem that the cathode tends to peel after firing.

The present invention is proposed in light of the above circumstances, and has the object of providing a solid oxide fuel cell that enables suppression of peeling of a cathode.

The solid oxide fuel cell according to the present invention has an anode, a cathode containing a perovskite complex oxide which is expressed by the general formula $ABO_3$ and includes at least one of La or Sr at the A site as a principal component, and a solid electrolyte layer disposed between the anode and the cathode. The cathode includes a cathode current collecting layer and a cathode active layer which is disposed on a solid electrolyte layer side of the cathode current collecting layer. The cathode includes a plurality of micro-cracks in a surface region within a predetermined distance from a surface on the solid electrolyte layer side.

The present invention provides a solid oxide fuel cell that enables suppression of peeling of a cathode.

DESCRIPTION OF EMBODIMENTS

An embodiment of the present invention will be described below making reference to the figures. Those aspects of configuration in the following description of the figures that are the same or similar are denoted by the same or similar reference numerals. However, the figures are merely illustrative, and the actual ratios or the like of the respective dimensions may differ. Therefore, the specific dimensions or the like should be determined by making reference to the following description. Alternatively, it is naturally the case that portions are included that exhibit a different ratio or relationship between dimensions in the respective figures.

Configuration of Solid Oxide Fuel Cell 10

Figure 1:
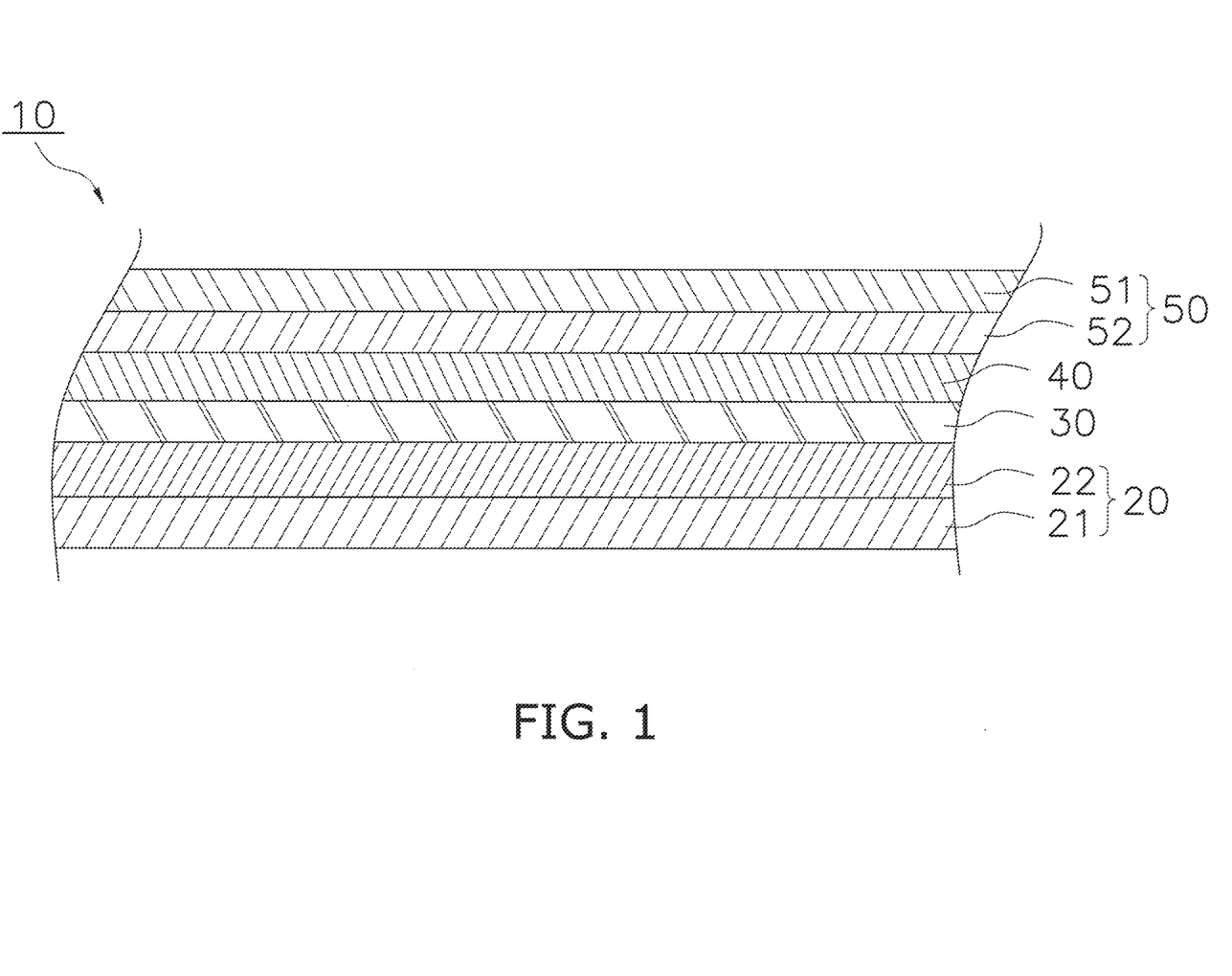
FIG. 1 is an enlarged cross sectional view of the configuration of a solid oxide fuel cell.
Figure 2:
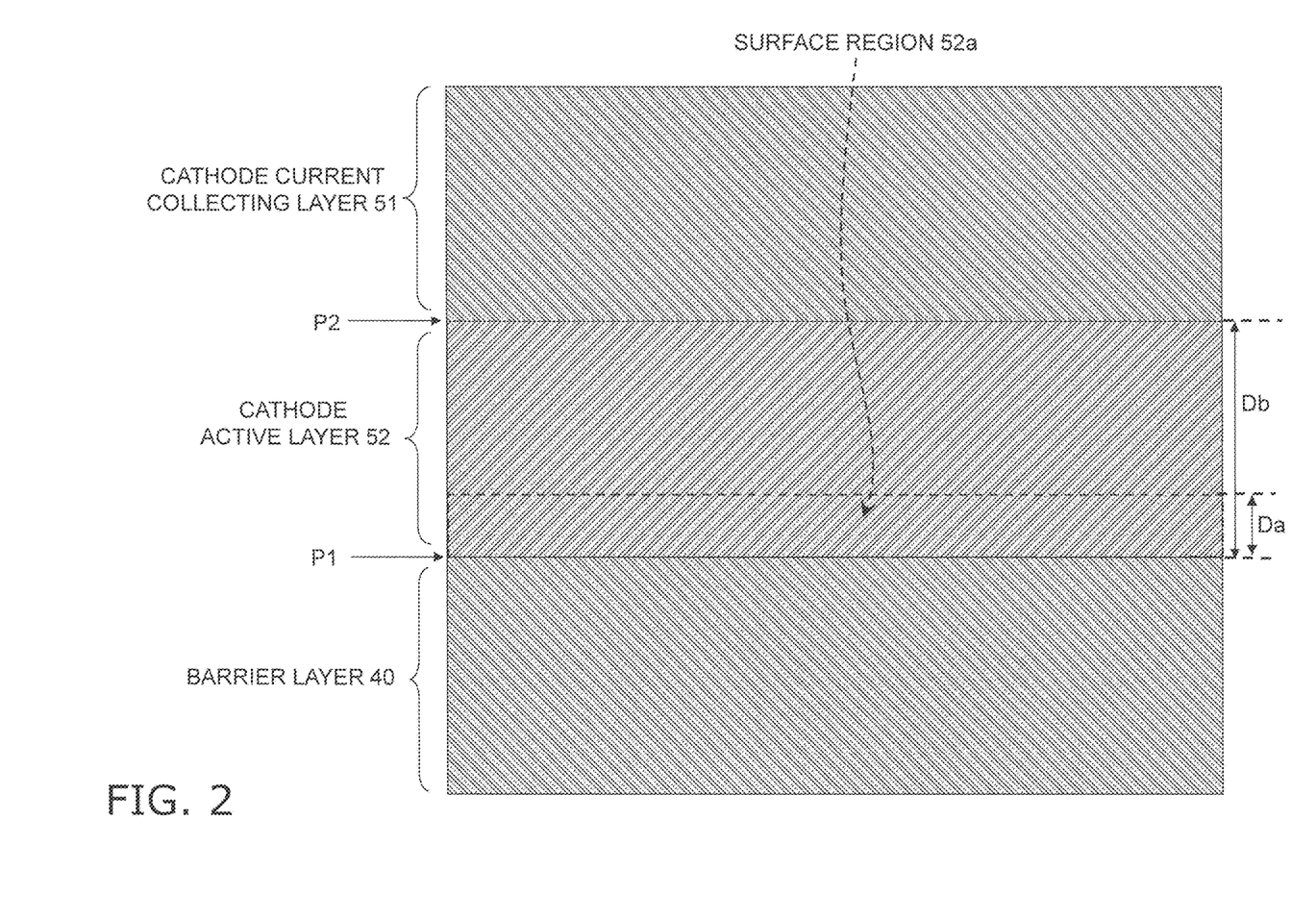
FIG. 2 is a partially enlarged view of FIG. 1.

A configuration of a solid oxide fuel cell (SOFC) 10 will be described making reference to the figures. FIG. 1 is an enlarged cross sectional view of the configuration of a solid oxide fuel cell 10. FIG. 2 is a partially enlarged view of a cathode 50.

The solid oxide fuel cell 10 includes a flat-tubular type, a segmented-in-series type, an anode-supporting type, an flat-plate electrolyte type, or cylindrical type for a fuel cell. As illustrated in FIG. 1, the solid oxide fuel cell 10 includes an anode 20, a solid electrolyte layer 30, a barrier layer 40 and a cathode 50.

The anode 20 functions as the anode for the solid oxide fuel cell 10. As illustrated in FIG. 1, the anode 20 includes an anode current collecting layer 21 and an anode active layer 22.

The anode current collecting layer 21 is configured as a porous tabular shaped fired body. The material for the anode current collecting layer 21 may include use of a material used in an anode current collecting layer of a conventional SOFC, and for example, includes NiO/Ni-8YSZ or NiO/Ni—$Y_2O_3$. The thickness of the anode current collecting layer 21 may be configured as 0.2 millimeters to 5.0 millimeters.

The anode active layer 22 is disposed on the anode current collecting layer 21. The anode active layer 22 is configured as a porous tabular shaped fired body. The material for the anode active layer 22 may include use of a material used in the anode active layer of a conventional SOFC, and for example, includes NiO/Ni-8YSZ. The thickness of the anode active layer 22 may be configured as 5 micrometers to 30 micrometers.

The solid electrolyte layer 30 is disposed between the anode 20 and the barrier layer 40. The solid electrolyte layer 30 functions to allow passage of oxygen ions produced in the cathode 50. The material of the solid electrolyte layer 30 may include zirconia based materials such as ScSZ or yttria-stabilized zirconia including 3YSZ, 8YSZ, and 10YSZ, or the like. The thickness of the solid electrolyte layer 30 may be configured as 3 micrometers to 30 micrometers.

The solid electrolyte layer 30 is dense, and it is preferred that the porosity of the solid electrolyte layer 30 is no more than 10%.

The barrier layer 40 is disposed between the solid electrolyte layer 30 and the cathode 50. The barrier layer 40 functions to inhibit formation of a high resistance layer between the solid electrolyte layer 30 and the cathode 50. The material used in the barrier layer 40 may include a ceria based material containing ceria ($CeO_2$) and a rare earth metal oxide as a solid solution in $CeO_2$. The ceria based material includes GDC, SDC, or the like. The thickness of the barrier layer 40 may be configured as 3 micrometers to 20 micrometers.

The barrier layer 40 is dense, and it is preferred that the porosity of the barrier layer 40 is no more than 15%. The barrier layer 40 forms an interface P1 with the cathode 50 (more specifically, with the cathode active layer 52).

The cathode 50 is disposed on the barrier layer 40. The cathode 50 functions as a cathode for the solid oxide fuel cell 10. The cathode 50 is porous and the porosity of the cathode 50 may be 25% to 50%. As illustrated in FIG. 1, the cathode 50 according to the present embodiment includes a cathode current collecting layer 51 and a cathode active layer 52.

The cathode current collecting layer 51 is configured as a porous tabular shaped fired body. The thickness of the cathode current collecting layer 51 may be configured as 30 micrometers to 500 micrometers. The cathode current collecting layer 51 is a portion configured to supply electrons, which are required for the power generation reactions of the solid oxide fuel cells, to the cathode active layer 52. The cathode current collecting layer 51 preferably exhibits higher electron conducting properties than the cathode active layer 52. The cathode current collecting layer 51 may exhibit oxygen ion conducting properties, or may not exhibit oxygen ion conducting properties. The material for the cathode current collecting layer 51 may include a material that contains a perovskite complex oxide expressed by the general formula $ABO_3$ as a principal component and that includes at least one of La or Sr at the A site. The material containing the perovskite complex oxide expressed by the general formula $ABO_3$ as a principal component and including at least one of La or Sr at the A site includes for example (La, Sr) $CoO_3$ or La(Ni, Fe, Cu)$O_3$, or the like, and the perovskite complex oxide expressed by Formula (1) below is of particular benefit.

$$\text{La}(\text{Ni}_{1-x-y}\text{Fe}_x\text{Cu}_y)\text{O}_{3-\delta} \quad (1)$$

In Formula (1), x is at least 0.03 and no more than 0.3, y is at least 0.05 and no more than 0.5, and δ is at least 0 and no more than 0.8. However, the composition of $\text{Ni}_{1-x-y}\text{Fe}_x\text{Cu}_y$ of the B site is not affected by the x value and the y value.

The coefficient of thermal expansion of the material contained as the principal component in the cathode current collecting layer 51 may be smaller than the coefficient of thermal expansion of the material contained as the principal component in the cathode active layer 52 described below. For example, the coefficient of thermal expansion of the perovskite complex oxide expressed by Formula (1) is approximately 13 to 14 ppm/K.

In the present embodiment, the term composition X "contains as a principal component" composition Y means that composition Y occupies at least 60 wt % of the total of composition X, more preferably occupies at least 70 wt %, and still more preferably occupies at least 90 wt %.

The cathode active layer 52 is configured as a porous tabular shaped fired body. The cathode active layer 52 is disposed on the solid electrolyte layer 30 side of the cathode current collecting layer 51. The cathode active layer 52 is cofired with the cathode current collecting layer 51. The cathode active layer 52 forms an interface P2 with the cathode current collecting layer 51. The thickness of the cathode active layer 52 may be configured as 5 micrometers to 50 micrometers.

The cathode active layer 52 is a portion configured to bear the power generation reactions of the solid oxide fuel cell 10. The cathode active layer 52 has oxygen ion conducting properties and electron conducting properties. The cathode active layer 52 may be configured by a composite material in which an oxygen ion conducting material is mixed with an electron conducting material, or a mixed oxygen ionic/electronic conductor. The mixed oxygen ionic/electronic conductor includes a perovskite complex oxide which is expressed by the general formula $ABO_3$ and includes at least one of La or Sr at the A site. This type of perovskite complex oxide includes a material such as LSF, that is to say, (La, Sr)$FeO_3$, LSC, that is to say, (La, Sr)$CoO_3$, or the like, and in particular, LSCF, that is to say, (La, Sr)(Co, Fe)$O_3$ is suitable. The cathode active layer 52 may include zirconia-based materials such as scandia-stabilized zirconia including ScSZ or yttria-stabilized zirconia including 3YSZ, 8YSZ, and 10YSZ, or the like.

The coefficient of thermal expansion of the material contained as the principal component in the cathode active layer 52 may be larger than the coefficient of thermal expansion of the material contained as the principal component in the cathode current collecting layer 51 described above. For example, the coefficient of thermal expansion of LSCF is approximately 14 to 16 ppm/k.

As illustrated in FIG. 2, the cathode active layer 52 includes a region (referred to below as a "surface region") 52a within a predetermined distance Da from the interface P2 with the barrier layer 40. That is to say, the surface region 52a of the cathode active layer 52 is a region within a predetermined distance Da from a surface on the solid electrolyte layer 30 side, and the surface region 52a is connected to the barrier layer 40. The predetermined distance Da may be configured as 0.5 micrometers to 3 micrometers. The cathode active layer 52 includes a plurality of micro-cracks SL in the surface region 52a.

Figure 3:
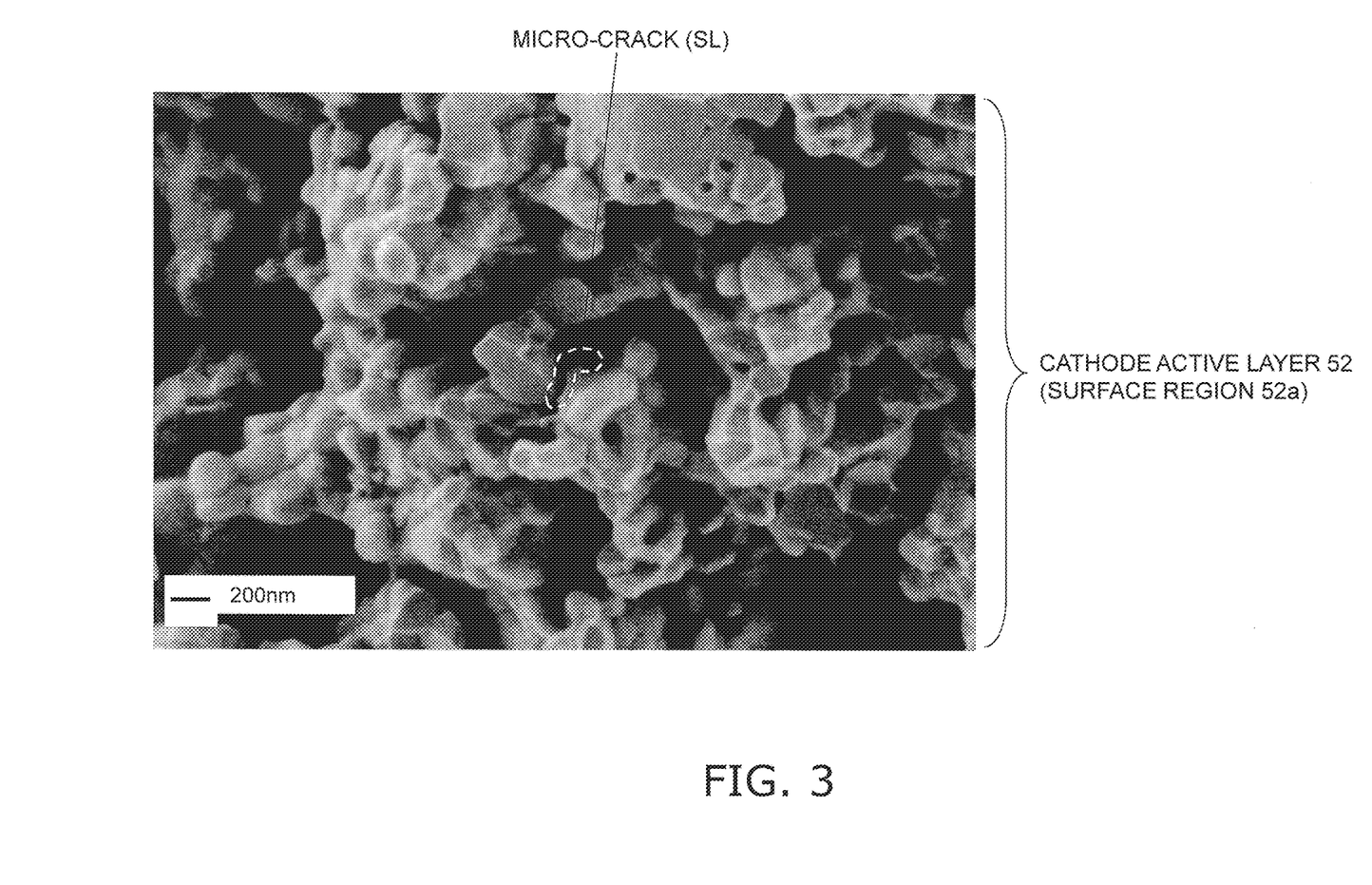
FIG. 3 is an SEM image with a 30,000× enlargement of a cross section of a surface region.
Figure 4:
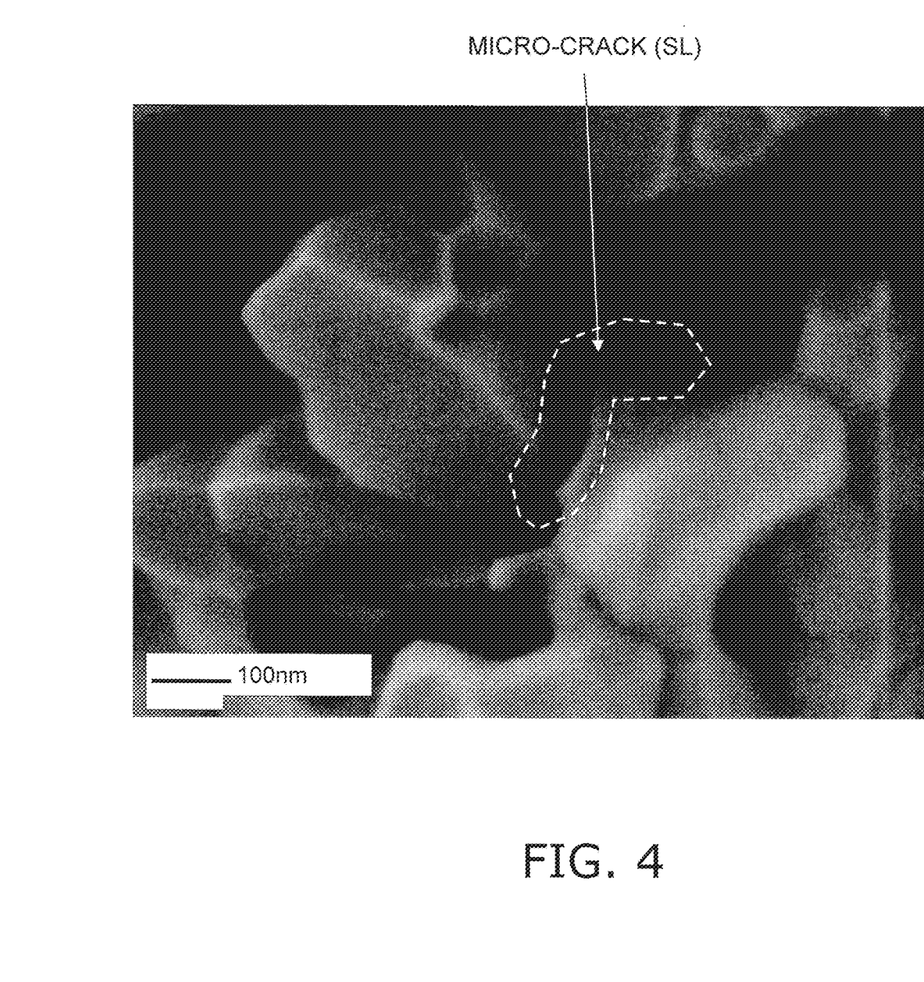
FIG. 4 is an SEM image with a 10,000× enlargement of a cross section of the surface region.

FIG. 3 is an SEM image with a 30,000× enlargement of a cross section of the surface region 52a. FIG. 4 is an SEM image with a 10,000× enlargement of a cross section of the surface region 52a. The center of the image shown in the SEM image in FIG. 4 displays the micro-cracks SL shown in the SEM image in FIG. 3.

The micro-cracks SL are formed in an inner portion of the surface region 52a. A part of the micro-cracks SL may be exposed on the surface (that is to say, the side surface of the solid oxide fuel cell 10) of the surface region 52a. The micro-crack SL may be formed along the grain boundary between the particles that configure the cathode active layer 52, or may be formed to split the particle that configure the cathode active layer 52. Furthermore, the micro-crack SL may be configured to connect a portion which is formed along the grain boundary and a portion which is formed to split the particle. The SEM images illustrated in FIG. 3 and FIG. 4 show the micro-crack SL which is formed along the grain boundary.

The number of the micro-cracks SL is preferably defined as at least one micro-crack SL being identified in one field of 20 arbitrary fields of view on a cross section of the surface region 52a when the 20 arbitrary fields of view are observed using a scanning electron microscope (SEM) with a magnification of 30,000×, and is more preferably defined as at least one micro-crack SL being identified in respectively two fields of the 20 arbitrary fields of view. The respective contraction and expansion of the micro-cracks SL formed with the above frequency enables suppression of distortion of the cathode 50 during cooling after a firing operation. Furthermore, although the SEM image in FIG. 3 illustrates a configuration in which one micro-crack SL is observed in one field of view, as described above, the plurality of micro-cracks SL is present in the surface region 52a.

The average length of the micro-cracks SL is preferably at least 100 nanometers and no more than 1000 nanometers. In the present embodiment, the average length is the average value of the linear distances between both ends of the respective micro-cracks SL in the SEM image. Furthermore, the average width of the micro-cracks SL is preferably at least 1 nanometer and no more than 100 nanometers. In the present embodiment, the average width is the average value of the maximum widths of the respective micro-cracks SL in the SEM image. The average length and the average width are preferably calculated based on the actual measured value of at least 10 micro-cracks SL.

Method of Manufacturing Solid Oxide Fuel Cell 10

Next, an example of a method of manufacturing a solid oxide fuel cell 10 will be described. However, the material, and various conditions such as the particle diameter, temperature and coating method described below may be suitably varied.

Firstly, a green body for the anode current collecting layer 21 is formed by molding anode current collecting layer powder using a die press molding method.

Next, a slurry is prepared by adding polyvinyl alcohol (PVA) as a binder to a mixture of a pore forming agent (for example, PMMA poly(methyl methacrylate resin)) and the anode active layer powder. Then, the green body for the anode active layer 22 is formed by printing the slurry using a printing method or the like onto the green body for the anode current collecting layer 21. In this manner, the green body for the anode 20 is molded.

Next, a slurry is prepared by mixing water and a binder with the solid electrolyte layer powder. Then, the green body for the solid electrolyte layer 30 is formed by coating the slurry using a coating method or the like onto the green body for the anode 20.

Next, a slurry is prepared by mixing water and a binder with the barrier layer powder. Then, the green body for the barrier layer 40 is formed by coating the slurry using a coating method or the like onto the green body for the solid electrolyte layer 30.

The laminated body of respective green bodies prepared as described above is cofired for 2 to 20 hours at 1300 to 1600 degrees C. to form a cofired body configured by the anode 20, the dense solid electrolyte layer 30 and the dense barrier layer 40.

Next a slurry is prepared by mixing water and a binder with the cathode active layer powder (for example, LSCF, LSF, LSC, and LSM-8YSZ, or the like). Then, a green body for the surface region 52a of the cathode active layer 52 is formed by coating the slurry using a coating method or the like onto the barrier layer 40.

Next a slurry is prepared by mixing water and a binder with the cathode active layer powder. Then, the green body for a region other than the surface region 52a (referred to below as "current collecting layer-side region") is formed by coating the slurry using a coating method or the like onto the green body for the surface region 52a.

The powder material used to configure the surface region 52a may exhibit different physical properties (average particle diameter, maximum particle diameter, particle size distribution, particle shape, or the like) from the material powder used to configure the current collecting layer-side region. Adjustment of the physical properties of the material powder enables control of the number of micro-cracks SL in the surface region 52a. More specifically, as the average particle diameter and the maximum particle diameter increases, or as the particle size distribution increases, the number of micro-cracks SL may be increased.

Next a slurry is prepared by mixing water and a binder with the cathode current collecting layer powder. Then, the green body for the cathode current collecting layer 51 is formed by coating the slurry using a coating method or the like onto the green body for the current collecting layer-side region. In this manner, the green body for the cathode 50 can be formed.

Next, the green body for the cathode 50 and the cofired body are sintered for 1 to 20 hours at 900 to 1100 degrees C. At that time, adjustment of the firing conditions (firing temperature, temperature increase rate, temperature decrease rate, or the like) enables control of the length and width of the micro-cracks SL in the surface region 52a. More specifically, as the firing temperature increases, or the temperature increase rate or the temperature decrease rate increases, the micro-cracks SL can be widened and lengthened.

Other Embodiments

The present invention is not limited to the above embodiment, and various changes or modifications may be added within a scope that does not depart from the scope of the invention.

(A) In the above embodiment, although the solid oxide fuel cell 10 includes the solid electrolyte layer 30, the barrier layer 40 and the cathode 50, there is no limitation in this regard.

For example, the solid oxide fuel cell 10 may omit inclusion of the barrier layer 40. In this configuration, the cathode 50 is formed onto the solid electrolyte layer 30 during a separate firing process to the solid electrolyte layer 30.

Furthermore, in substitution for a dense barrier layer 40, the solid oxide fuel cell 10 may include a porous barrier layer. In this configuration, the porous barrier layer is formed onto the solid electrolyte layer 30 during a separate firing process to the solid electrolyte layer 30. The cathode is formed onto the porous barrier layer during a separate firing process to the porous barrier layer. The porous barrier layer may be configured for example by a ceria based material.

Furthermore, the solid oxide fuel cell 10 may include a porous barrier layer that is interposed between the barrier layer 40 and the cathode 50. In this configuration, the porous barrier layer is formed onto the barrier layer 40 during a separate firing process to the barrier layer 40. The cathode is formed onto the porous barrier layer during a separate firing process to the porous barrier layer.

The present invention is configured to suppress peeling of the cathode 50 when formed onto the fired body (solid electrolyte layer or barrier layer). Consequently, the cathode 50 may be formed in a separate firing step to the fired body, and there is no influence on the mechanism that peeling of the cathode 50 is suppressed irrespective of whether the cathode 50 is formed on a dense layer or is formed on a porous layer.

(B) In the above embodiment, although an SEM was used for observation of the micro-cracks SL, there is no limitation in this regard. When observing the micro-cracks SL, use is also possible to an electron microscope such as a transmission electron microscope (TEM) or the like.

(C) Although there is no particular disclosure in the above embodiment, the cathode active layer 52 may also include the micro-cracks SL in the current collecting layer-side region other than the surface region 52a.

(D) In the above embodiment, the cathode 50 is configured to include a cathode collecting layer 51 and a cathode active layer 52 that has the surface region 52a. However, the cathode collecting layer 51 may be omitted.

(E) In the above embodiment, although the cathode 50 includes only one surface region 52a, a plurality of surface regions 52a may be provided.

(F) Although there is no particular disclosure in the above embodiment, experimental confirmation has been obtained that suppression of peeling of the anode 20 is enabled by the micro-cracks SL that are formed in a region within a predetermined distance from the solid electrolyte layer 30 of the anode 20.

(G) In the above embodiment, although only a portion of the cathode active layer 52 is configured as the surface region 52a, the whole of the cathode active layer 52 may be configured as the surface region 52a. Furthermore, a portion or the whole of the cathode collecting layer 51 and the whole of the cathode active layer 52 may be configured as the surface region 52a. That is to say, the surface region 52a may be provided near to the solid electrolyte layer 30 on the cathode 50.

EXAMPLES

Although the examples of a cell according to the present invention will be described below, the present invention is not limited to the following examples.
Manufacture of Samples No. 1, No. 11, No. 15 and No. 23

In the following description, Samples No. 1, No. 11, No. 15 and No. 23 were prepared.

Firstly, a cofired body including the barrier layer, and the solid electrolyte layer and the anode was prepared.

Next, a green body for the cathode active layer was formed by coating a slurry containing the active layer material shown in Table 1 onto the barrier layer. The average particle diameter of the active layer material powder used in the slurry was 0.2 to 0.5 micrometers, and the maximum particle diameter of the active layer material powder used in the slurry was 1.0 to 1.5 micrometers. Furthermore, the thickness of the cathode active layer was adjusted as shown in Table 1 by varying the number of coatings of the slurry.

Next, a green body for the cathode current collecting layer was formed by coating a slurry containing the current collecting layer material shown in Table 1 onto the cathode active layer.

Next, a laminated body of the respective green bodies for the cathode active layer and the cathode current collecting layer was fired for 1 to 20 hours at 950 to 1000 degrees C. to thereby prepare the cathode. At this time, the rate of temperature increase was 100 degrees C./hr and the rate of temperature decrease was 100 degrees C./hr.
Manufacture of Samples No. 2 to No. 10, No. 12 to No. 14, No. 16 to No. 22, No. 24 and No. 25

In the following description, Samples No. 2 to No. 10, No. 12 to No. 14, No. 16 to No. 22, No. 24 and No. 25 were prepared.

Firstly, a cofired body of the barrier layer, and the solid electrolyte layer and the anode was prepared.

Next, a green body for the surface region of the cathode active layer was formed by coating a slurry containing the cathode active layer material shown in Table 1 onto the barrier layer. At this time, the frequency (number) of the micro-cracks was adjusted as shown in Table 1 by varying the average particle diameter, the maximum particle diameter, and the grain size distribution of the powder used in the slurry. More specifically, the average particle diameter and the maximum particle diameter of Samples No. 2, No. 5, No. 10, No. 13, No. 17, and No. 22 was 0.2 to 0.5 micrometers and 1.0 to 1.5 micrometers, and the average particle diameter and the maximum particle diameter of the other samples was 0.5 to 1.4 micrometers and 2.0 to 2.8 micrometers. Furthermore, the thickness of the surface region was adjusted as shown in Table 1 by varying the number of coatings of the slurry.

Then, the slurry containing the cathode active layer material shown in Table 1 was coated on the green body for the surface region to thereby form the green body for the current collecting layer-side region of the cathode active layer. The slurry contains the same powder as Samples No. 1, No. 11, No. 15 and No. 23.

Next, the slurry containing the current collecting layer material shown in Table 1 was coated on the green body for the current collecting layer-side region to thereby form the green body for the cathode current collecting layer.

Then, a laminated body of the respective green bodies for the cathode active layer and the cathode current collecting layer was fired for 1 to 20 hours at 950 to 1100 degrees C. to thereby prepare the cathode. At this time, the length and width of the micro-cracks formed in the surface region was adjusted as shown in Table 1 by varying the firing conditions. More specifically, the firing temperature, rate of temperature increase, and rate of temperature decrease for Samples No. 2, No. 5, No. 10, No. 13, No. 17, and No. 22 was 950 to 1000 degrees C., 100 to 150 degrees C./hr, and 100 to 150 degrees C./hr. The firing temperature, rate of temperature increase, and rate of temperature decrease for Samples No. 3, No. 4, No. 6 to No. 8, No. 12, No. 14, No. 16, No. 18 to No. 20, No. 24 and No. 25 was 1000 to 1100 degrees C., 200 to 400 degrees C./hr, and 200 to 250 degrees C./hr. The firing temperature, rate of temperature increase, and rate of temperature decrease for Samples No. 9, and No. 21 was 1050 to 1100 degrees C., 300 to 400 degrees C./hr, and 230 to 250 degrees C./hr.
Observation of Micro-Cracks Cross sections of Sample No. 1 to Sample No. 25 were observed using an SEM at a magnification of 30,000× to thereby observe the presence or absence of micro-cracks in the surface region of the cathode active layer. Arbitrary 20 fields of view were observed in relation to each sample.

The width and length of all identified micro-cracks were measured to calculate an average width and average length for the micro-cracks. The number (frequency) of identified micro-cracks, the average width, and the average length are shown in Table 1. The average width is the average value of the maximum widths of the micro-cracks, and the average length is the average value of the linear distances between both ends of the respective micro-cracks.
Presence/Absence of Peeling After Firing The presence or absence of peeling on the interface between the cathode and the barrier layer was confirmed by microscope observation of the cross section of Samples No. 1 to No. 25 after firing. The confirmed results are shown in Table 1.

In Table 1, the samples confirmed to exhibit peeling of at least 5 micrometers that may affect the cathode characteristics are evaluated by "X", the samples confirmed to exhibit peeling of no more than 5 micrometers are evaluated by "O", and the samples confirmed not to exhibit peeling are evaluated by "⊚".
Presence/Absence of Peeling After Heat Cycle Testing Samples confirmed not to exhibit peeling after firing were heated from room temperature to 800 degrees C. for 30 minutes and then cooled to room temperature in one hour while maintaining a reducing atmosphere. This cycle was repeated 10 times.

Then, the cross section of each sample was observed using a microscope, and the presence or absence of peeling on the interface between the barrier layer and the cathode was confirmed. The confirmed results are shown in Table 1.

In Table 1, the samples confirmed to exhibit peeling of no more than 5 micrometers are evaluated by "O", and the samples confirmed not to exhibit peeling are evaluated by "⊚".

TABLE 1

| | Cathode | | | | Micro-Cracks in Surface Region | | | Peeling after Firing | | Peeling after Heat Cycle Testing | |
|---|---|---|---|---|---|---|---|---|---|---|---|
| | Active Layer | | Cathode Current Collecting Layer | | Confirmed Number of | | | | | | |
| | | Surface | | | | | | | | | |
| | Film | Region | | Film | Fields in | Average | Average | | | | |
| Sample No. | Material | Thickness (μm) | Thickness (μm) | Material | Thickness (μm) | Arbitrary 20 Fields | Width (nm) | Length (nm) | Peeling Frequency | Determination | Peeling Frequency | Determination |
| 1 | LSCF | 15 | None | LNFC | 80 | | None | | 2/10 | X | Not Tested | |
| 2 | LSCF | 20 | 1.0 | LNFC | 120 | 1/20 | 2.0 | 150 | 1/10 (Slight) | ○ | Not Tested | |
| 3 | LSCF | 25 | 0.5 | LNFC | 100 | 4/20 | 0.5 | 70 | 0/10 | ◎ | 1/10 (Slight) | ○ |
| 4 | LSCF | 30 | 1.5 | LNFC | 150 | 2/20 | 5.0 | 100 | 0/10 | ◎ | 0/10 | ◎ |
| 5 | LSCF | 35 | 2.5 | LNFC | 80 | 1/20 | 24 | 250 | 1/10 (Slight) | ○ | Not Tested | |
| 6 | LSCF | 30 | 1.5 | LNFC | 120 | 3/20 | 44 | 400 | 0/10 | ◎ | 0/10 | ◎ |
| 7 | LSCF | 15 | 2.0 | LNFC | 50 | 2/20 | 77 | 200 | 0/10 | ◎ | 0/10 | ◎ |
| 8 | LSCF | 18 | 2.5 | LNFC | 50 | 5/20 | 100 | 1000 | 0/10 | ◎ | 0/10 | ◎ |
| 9 | LSCF | 28 | 2.0 | LNFC | 80 | 2/20 | 150 | 1220 | 0/10 | ◎ | 1/10 (Slight) | ○ |
| 10 | LSCF | 25 | 3.0 | LNFC | 100 | 1/20 | 80 | 950 | 1/10 (Slight) | ○ | Not Tested | |
| 11 | LSCF | 25 | None | LSC | 50 | | None | | 4/10 | X | Not Tested | |
| 12 | LSCF | 25 | 1.5 | LSC | 30 | 2/20 | 1.0 | 100 | 0/10 | ◎ | 0/10 | ◎ |
| 13 | LSCF | 15 | 1.0 | LSC | 60 | 1/20 | 20 | 120 | 1/10 (Slight) | ○ | Not Tested | |
| 14 | LSCF | 30 | 2.5 | LSC | 40 | 3/20 | 30 | 200 | 0/10 | ◎ | 0/10 | ◎ |
| 15 | LSF | 10 | None | LNFC | 80 | | None | | 1/10 | X | Not Tested | |
| 16 | LSF | 25 | 1.0 | LNFC | 100 | 2/20 | 0.7 | 70 | 0/10 | ◎ | 2/10 (Slight) | ○ |
| 17 | LSF | 25 | 0.5 | LNFC | 50 | 1/20 | 1.0 | 220 | 1/10 (Slight) | ○ | Not Tested | |
| 18 | LSF | 30 | 1.5 | LNFC | 100 | 3/20 | 8 | 150 | 0/10 | ◎ | 0/10 | ◎ |
| 19 | LSF | 20 | 2.0 | LNFC | 80 | 2/20 | 35 | 350 | 0/10 | ◎ | 0/10 | ◎ |
| 20 | LSF | 25 | 2.0 | LNFC | 100 | 4/20 | 60 | 1000 | 0/10 | ◎ | 0/10 | ◎ |
| 21 | LSF | 30 | 2.5 | LNFC | 100 | 2/20 | 130 | 1150 | 0/10 | ◎ | 3/10 (Slight) | ○ |
| 22 | LSF | 20 | 2.0 | LNFC | 80 | 1/20 | 150 | 800 | 1/10 (Slight) | ○ | Not Tested | |
| 23 | SSC | 25 | None | LSC | 50 | | None | | 4/10 | X | Not Tested | |
| 24 | SSC | 15 | 1.5 | LSC | 100 | 2/20 | 40 | 200 | 0/10 | ◎ | 0/10 | ◎ |
| 25 | SSC | 15 | 2.0 | LSC | 80 | 3/20 | 70 | 440 | 0/10 | ◎ | 0/10 | ◎ |

As shown in Table 1, Samples No. 2 to No. 10, No. 12 to No. 14, No. 16 to No. 22, No. 24 and No. 25, in which a micro-crack was observed in at least one field of view of arbitrary 20 fields of view, enabled suppression of production of peeling that may affect the cathode characteristics in the interface between the barrier layer and the cathode. This effect is due to the fact that distortion of the cathode after firing was mitigated by the micro-cracks formed in the surface region.

In samples in which at least one micro-crack was observed respectively in at least two fields of view of arbitrary 20 fields of view, production of slight peeling after firing was also suppressed.

In samples in which a micro-crack was observed to have an average width of at least 1.0 nanometer to no more than 100 nanometers, and an average length of at least 100 nanometers to no more than 1000 nanometers, production of slight peeling after heat cycle testing was also suppressed.

INDUSTRIAL APPLICATION

The solid oxide fuel cell of the present invention can be used in the field of fuel cells to enable suppression of peeling of the cathode.

What is claimed is:
1. A solid oxide fuel cell comprising:
an anode;
a cathode containing a perovskite complex oxide expressed by the general formula $ABO_3$ as a principal component, the perovskite complex oxide including at least one of La or Sr at the A site; and
a solid electrolyte layer disposed between the anode and the cathode,
the cathode including a plurality of micro-cracks in a surface region within a distance of 0.5 micrometers from a surface on a solid electrolyte layer side, the plurality of micro-cracks having an average length of at least 100 nanometers to no more than 1000 nanometers,
the plurality of micro-cracks having an average width of at least 1 nanometer to no more than 100 nanometers, and
the plurality of micro-cracks including at least one of a micro-crack which is formed along a grain boundary between particles that configure the cathode, a micro-crack which is formed to split at least one of the particles, and a micro-crack which has a portion that is formed along the grain boundary and a portion that is formed to split at least one of the particles.
2. The solid oxide fuel cell according to claim 1, wherein at least one micro-crack of the plurality of micro-cracks is observed in at least one field of arbitrary 20 fields in a cross section of the surface region when the arbitrary 20 fields are observed using a scanning electron microscope with a magnification of 30,000×.
3. The solid oxide fuel cell according to claim 2, wherein at least one micro-crack of the plurality of micro-cracks is observed in respectively at least two fields of the arbitrary 20 fields in the cross section of the surface region when the arbitrary 20 fields are observed using a scanning electron microscope with a magnification of 30,000×.
4. The solid oxide fuel cell according to claim 1, wherein the cathode has a cathode current collecting layer, and a cathode active layer disposed between the cathode current collecting layer and the solid electrolyte layer, the cathode current collecting layer contains the perovskite complex oxide expressed by the general for- mula $ABO_3$ as a principal component, A including at least La, and B including at least one of Ni, Fe and Cu, and the cathode active layer contains a material expressed by the general formula $A'B'O_3$ as a principal component, A' including at least one of La and Sr, and B' including at least one of Co and Fe.

5. The solid oxide fuel cell according to claim 1, wherein a material used to configure the surface region has at least one different physical property than a material used to configure a second region of the cathode.

* * * * *